US010749955B2

United States Patent
Rago et al.

(10) Patent No.: US 10,749,955 B2
(45) Date of Patent: Aug. 18, 2020

(54) ONLINE CACHE MIGRATION IN A DISTRIBUTED CACHING SYSTEM USING A HYBRID MIGRATION PROCESS

(71) Applicant: Dropbox, Inc., San Francisco, CA (US)

(72) Inventors: Stephen Rago, Warren, NJ (US); Jessica Kenney, New York, NY (US); Alex Jeffrey Palkovic, San Francisco, CA (US); Aleksandr Bakhturin, Jersey City, NJ (US); Gustavo Gonzalez, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 268 days.

(21) Appl. No.: 15/974,477

(22) Filed: May 8, 2018

(65) Prior Publication Data

US 2019/0349427 A1    Nov. 14, 2019

(51) Int. Cl.
*H04L 29/08* (2006.01)
*G06F 12/0868* (2016.01)
*G06F 12/0888* (2016.01)

(52) U.S. Cl.
CPC ...... *H04L 67/1095* (2013.01); *G06F 12/0868* (2013.01); *G06F 12/0888* (2013.01); *H04L 67/1097* (2013.01); *H04L 67/2852* (2013.01); *G06F 2212/284* (2013.01)

(58) Field of Classification Search
None
See application file for complete search history.

(56) References Cited

U.S. PATENT DOCUMENTS

| 6,938,039 | B1 | 8/2005 | Bober et al. |
| 7,085,894 | B2 | 8/2006 | Krissell et al. |
| 8,566,547 | B2 | 10/2013 | Montgomery et al. |
| 9,460,017 | B1 | 10/2016 | Mehta et al. |
| 2010/0161751 | A1* | 6/2010 | Stewart .................. G06F 3/061 709/213 |
| 2011/0047411 | A1* | 2/2011 | Gille .................... G06F 11/073 714/723 |
| 2014/0181015 | A1* | 6/2014 | Bonzini ................ G06F 16/273 707/613 |

(Continued)

OTHER PUBLICATIONS

Wikipedia, "Redis", https://en.wikipedia.org/wiki/Redis, last viewed on Mar. 28, 2018, 5 pages.

(Continued)

*Primary Examiner* — Davoud A Zand
(74) *Attorney, Agent, or Firm* — Hickman Palermo Becker Bingham LLP; Adam C. Stone

(57) ABSTRACT

Techniques for an online cache migration in a distributed caching system using a hybrid migration process include an application server in a network environment determining that an online cache migration from a source cache to a target cache is running. Based on this, the application server selectively mirroring writes to the source cache in the target cache. Meanwhile, an external migration controller migrates the cache from the source cache to the target cache in a way that does not require the external migration controller or the application server to synchronize their concurrent access to the source and target caches yet still allows the application server to read, write, and delete cache data in the source cache during the migration.

20 Claims, 10 Drawing Sheets

(56) References Cited

U.S. PATENT DOCUMENTS

| | | | | |
|---|---|---|---|---|
| 2014/0181397 A1* | 6/2014 | Bonzini | ............... | G06F 12/16 |
| | | | | 711/112 |
| 2015/0066845 A1* | 3/2015 | Beard | ............... | G06F 16/273 |
| | | | | 707/613 |
| 2015/0066846 A1* | 3/2015 | Beard | ............... | G06F 16/119 |
| | | | | 707/613 |
| 2015/0066852 A1* | 3/2015 | Beard | ............... | G06F 16/184 |
| | | | | 707/625 |
| 2015/0067759 A1* | 3/2015 | Beard | ............... | H04L 63/20 |
| | | | | 726/1 |
| 2016/0188627 A1* | 6/2016 | Beard | ............... | G06F 16/178 |
| | | | | 707/625 |
| 2018/0373553 A1* | 12/2018 | Connor | ............ | G06F 9/45558 |

OTHER PUBLICATIONS

Wikipedia, "Memcached", https://en.wikipedia.org/wiki/Memcached, last viewed on Mar. 28, 2018, 6 pages.

Lamping, John et al., "A Fast, Minimal Memory, Consistent Hash Algorithm", dated Jun. 9, 2014, 12 pages.

* cited by examiner

ONLINE CACHE MIGRATION IN A DISTRIBUTED CACHING SYSTEM USING A HYBRID MIGRATION PROCESS

TECHNICAL FIELD

This disclosure relates generally to online cache migration, and in particular, to online cache migration in a distributed caching system using a hybrid migration process.

BACKGROUND

In distributed caching systems, especially in situations where the amount of cached data grows over time (such as with an online service that is continually adding new users), resharding or rebalancing the caching system is often needed to maintain an acceptable level of system performance. This causes at least two issues. First, resharding or rebalancing the caching system may require temporarily bringing the system offline while the resharding or rebalancing is performed. During the time the system is offline, read requests from applications that would otherwise have been served by the caching system are instead served from a backing data storage system, potentially creating catastrophic computing resource demand on the backing data storage system. Second, the in-place nature of the resharding or rebalancing is an issue. In particular, reverting the caching system to the pre-resharding and pre-rebalancing state may be time consuming or impractical. For example, reverting may require starting from an empty or cold cache or bringing the caching system offline again. Combined, these two issues make it difficult to effectively reshard or rebalance the cache since bringing the caching system temporarily offline or starting with an empty or cold cache is not practical in many circumstances because of the impact it causes on the computing resources of the backing data storage system.

Embodiments disclosed herein address these and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In some embodiments of the present invention, a computer-implemented method for online cache migration in a distributed caching system using a hybrid migration process includes determining, at an application server in a network environment, that an online cache data migration is running. In some embodiments, the application server executes using one or more computing devices and is programmed to execute application server instructions. In some embodiments of the present invention, the application server is communicatively coupled to a source caching server and a target caching server in the network environment. In some embodiments of the present invention, the source caching server and the target caching server each execute using one or more computing devices and are each programmed to execute caching instructions. In some embodiments of the present invention, the source caching server and the target caching server are each a distributed caching system composed of a plurality of computing nodes (e.g., a computing device, or a virtual machine, or an application container).

In some embodiments of the present invention, the method further includes selectively mirroring, at the application server, writes to the source caching server in the target caching server. In some embodiments of the present invention, the selectively mirroring is performed based on the application server determining that the online cache data migration is running.

In some embodiments of the present invention, the method further includes migrating, at an external migration controller in the network environment, values associated with a set of source keys from the source caching server to the target caching server including for at least one particular key of the set of source keys: copying a first value of the particular key from the source caching server to the target caching sever, determining whether the first value of the particular key changed to a second value at the source caching server during an upper-bound race condition vulnerability window for the first value and the particular key, and copying the second value from the source caching server to the target caching server based on determining that the first value of the particular key changed to the second value at the source caching server during the upper-bound race condition vulnerability window for the first value and particular key. In some embodiments of the present invention, the external migration controller executes using one or more computing devices, is programmed to execute external migration control instructions, and is communicatively coupled to the source caching server and the target caching server in the network environment.

Depending on the specific features implemented, some embodiments of the present invention may exhibit some, none, or all the following technical advantages. One technical advantage of some embodiments of the present invention is that the source caching server may remain online and be used by the application server for both reading and writing cache data while the online cache data migration is being performed. Because of this, the backing data store server is not overburdened with read requests from the application server that would otherwise be submitted to the backing data store server if the source caching server were taken offline during the migration.

Another technical advantage of some embodiments of the present invention is that cache data in the target caching server is made eventually consistent with cache data in the source caching server during the cache migration. Significantly, this eventual consistency is achieved without requiring the external migration controller or the application server to acquire concurrency synchronization primitives (e.g., locks) for guaranteeing mutually exclusive access to the cache data stored in the source caching server and the target caching server when performing cache migration operations. Because of this, performance of the system is not hindered by synchronization primitive contention overhead that would otherwise be associated with coordinating the acquisition and release of concurrency synchronization primitives between the application server and the external migration controller.

Yet another technical advantage of some embodiments of the present invention is that the cache migration is non-destructive on the cache data in the source caching server. Because of this, the application server can revert to using the source caching server without loss of cache data, even after the online cache migration has completed. This ability to revert to using the source caching server might be needed, for example, if there is an issue, error, or problem detected with the application server using the target caching server after the migration has completed and after the application server has begun using the target caching server.

Still yet another technical advantage of some embodiments of the present invention is that the application server and the external migration controller divide the migration tasks between them. This reduces computing resource load on the application server compared to a migration process where the application server performs all the migration tasks.

Other technical advantages will be clear to one skilled in the art from the following figures, description, and claims.

BRIEF DESCRIPTION OF THE DRAWINGS

Reference is now made to the following description taken in conjunction with the accompanying drawings, wherein like reference numbers represent like parts, and which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Example Cache Migration Network Environment

Figure 1:
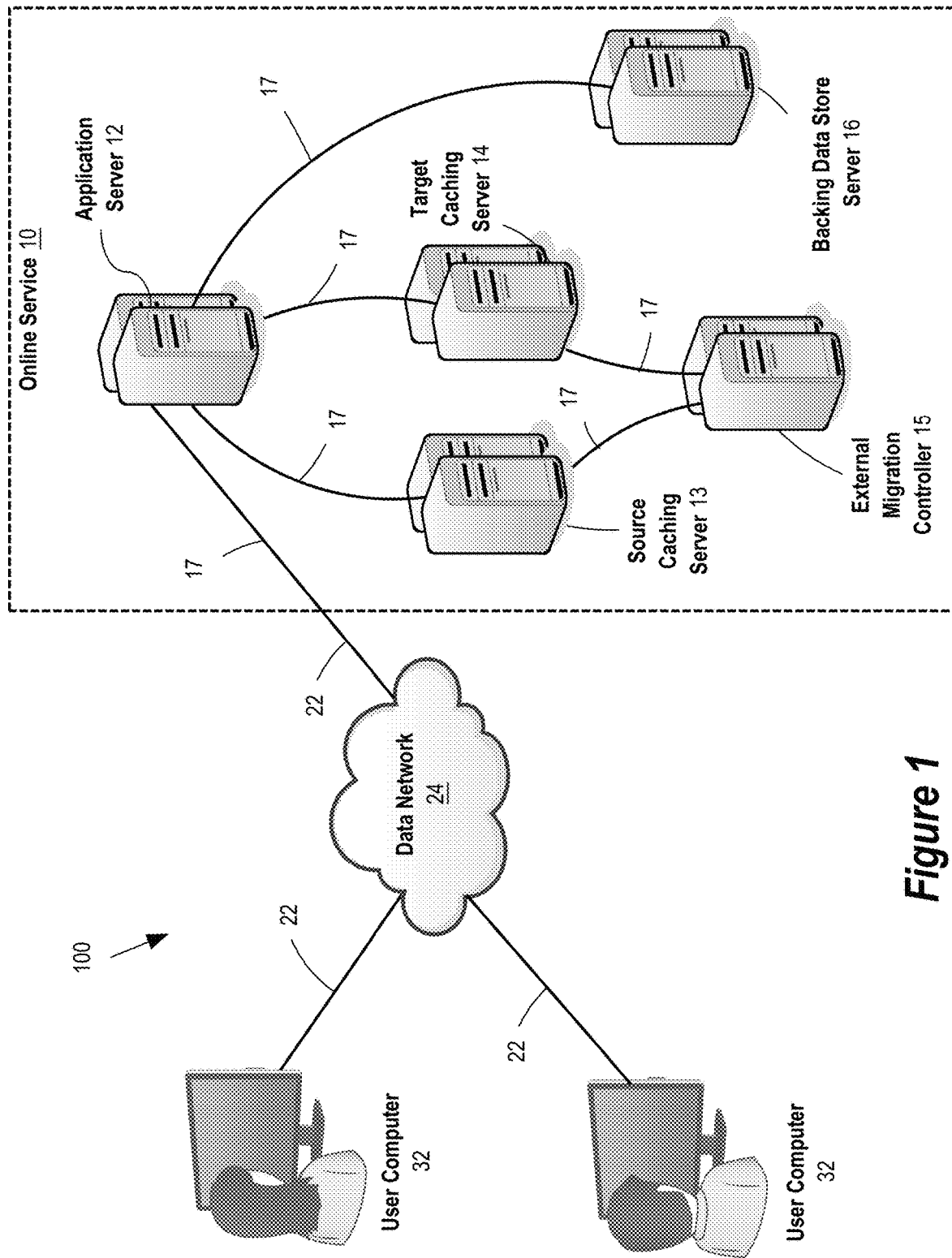
FIG. 1 is a block diagram that depicts an example network environment for an online cache migration in a distributed caching system using a hybrid migration process.

FIG. 1 is a block diagram of a system 100 for facilitating online cache migration in a network environment. Within the system 100, a service 10 is provided online by a data network 24 to users of multiple user computers 32. The service 10 has a number of servers 12, 13, 14, and 16 that implement functionality of the service 10 that is provided to the users.

The service 10 also has an external migration controller 15 involved in migrating the cache data (or a portion thereof) at source caching server 13 to target caching server 14.

Prior to the migration, source caching server 13 may be used by the application server 12 as its primary (first choice) caching server for cache reads, writes, and deletes. After the cache migration is finalized, the application server 12 may use target caching server 14 as its primary caching server for cache reads, writes, and deletes and may no longer use the source caching server 13 as its primary caching server for cache reads, writes, and deletes.

Some embodiments of the present invention allow the application server 12 to revert to using the source caching server 13 as its primary caching server for cache reads, writes, and deletes if an issue, problem, or error is detected with the application server 12 after the migration has completed and the application server 12 has begun using the target caching server 14 as its primary caching server for cache reads, writes, and deletes.

Within service 10, the servers 12, 13, 14, and 16 and migration controller 15 are communicatively coupled by network connections 17 through an internal data network (not depicted) of the online service 10. A network connection 17 may be composed of one or more transmission control protocol (TCP) connections, for example.

The user computers 32 are communicatively coupled to online service 10 by network connections 22 (e.g., one or more TCP connections) through data network 24 (e.g., the Internet). A network connection 22 may be composed of one or more TCP connections, for example.

In accordance with some embodiments of the present invention, the cache data migration is "online" such that service 10 continues to operate including continuing to serve requests from user computers 32 while the cache data is being migrated from source caching server 13 to target caching server 14.

In some embodiments of the present invention, due to the non-destructive nature of the migration with respect to the cache data in the source caching server 13, users of user computers 32 will not perceive any significantly degraded responsiveness by the service 10 to their online requests while the migration is being performed. This is because the application server 12 can continue to use the source caching server 13 as its primary caching server (including continuing to read, write, and delete cache data in the source caching server 13) while the cache data its being migrated from the source caching server 13 to the target caching server 14.

The online service 10 is not limited to any particular type of online service. In some embodiments of the present invention, the online service 10 holds and supports millions of user accounts or more, or is otherwise a large-scale or Internet-scale service. However, the online service 10 could instead be an enterprise-scale or campus-scale service that serves hundreds or thousands of user accounts. Regardless whether the online service 10 is Internet-scale or enterprise scale the online service 10 can continue providing services to users while cache migration is being performed.

During an online cache migration, users of user computers 32 may direct user input to the user computers 32 which cause user requests (e.g., HTTP/S requests) to be sent through network connections 22 over data network 24 and received by the online service 10. Agents of the online service 10 operating autonomously at the user computers 32 may also cause user requests to be sent from the user computers 32 to the online service 10. Depending on the user request, a user request received by the online service 10 from a user computer 32 may in turn cause one or more application requests (e.g., HTTP/S requests) to be sent to application server 12 from an internal server (e.g., a presentation server) of online service 10 that received the user request. Alternatively, application server 12 may receive the user request sent from the user computer 32.

Depending on the application request or the user request received, the application server 12 may in turn send one or more cache read requests (e.g., HTTP/S requests) to source caching server 13. A cache read request may attempt to obtain (read) certain data stored in the cache at source caching server 13. If the certain data is stored in the cache at the source caching server 13 (a cache hit), then the source caching server 13 responds to the cache read request by sending the certain data back to the application server 12. The application server 12 may then use this data for formulating and sending a response to the application request or the user request.

On the other hand, if the certain data requested by the cache read request from the application server 12 is not stored in the source caching server 13 (a cache miss), then the requesting application server 12 is notified of this and the application server 12 may then request the certain data from backing data store server 16.

The backing data store server 16 may be based on any database system for persistently storing the data that is cached by source caching server 13. For example, the backing data store server 16 may be a distributed key-value database system, a relational database system, etc.

During an online cache migration, it is also possible for application server 12 to send cache read requests to source caching server 13 outside the context of a user request from a user computer 32. For example, the application server 12 may autonomously send read requests to source caching server 13. For example, the application server 12 may autonomously send the cache read requests on a periodic or timed basis or in response to an event or a condition detected within service 10.

In addition, or alternatively, the application server 12 may send cache read requests at the direction of a request or command issued to the application server 12 from another server. For example, the request or command may be issued from an administrative server to the application server 12 by an employee, system administrator, developer-operations person (dev-op), engineer, or other person responsible for operating the application server 12.

Some embodiments of the present invention allow the application server 12 to continue issuing read requests to the source caching server 13 while the cache migration is being performed and those read requests will be served by the source caching server 13 in the same manner as if the cache migration were not being performed when the read requests are issued. For example, the application server 12 is not required to obtain a lock or acquire another synchronization primitive on the cache data of the source caching server 13 to successfully read/write data from/to the cache at source caching server 13 while the cache migration is being performed.

Allowing the application server 12 to continue reading cache data from the source caching server 13 during the migration provides the technical advantage that the application server 12 can obtain cache data from the source caching server 13 instead of having to read the cache data from backing data store server 16. This conserves the computing resources of the backing data store server 16 during the cache migration.

Like with cache read requests, the application server 12 can also issue cache write requests to the source caching server 13 while the cache migration is being performed without having to acquire a lock or other synchronization primitive on the cache data at the source caching server 13.

For example, after (or before depending on the cache write policy) successfully inserting or updating a data item in backing data store server 16, the application server 12 can issue a cache write request to source caching server 13 to have the inserted or updated (or the to be inserted or to be updated) data item stored in the cache (cached) at source caching server 13. For purposes of this disclosure, a cache write request encompasses any of a request to insert a new data item into a cache or a request to update an existing data item stored in a cache.

Like with cache read requests and cache write requests, the application server 12 can also issue cache delete requests to the source caching server 13 while the cache migration is being performed without having to acquire a lock or other synchronization primitive on the cache (or data thereof) at the source caching server 13. For example, after (or before depending on the cache delete policy) successfully deleting a data item from backing data store server 16, the application can issue a cache delete request to source caching server 13 to have the deleted (or to be deleted) data item removed from the cache at source caching server 13.

Source caching server 13 may store cache data in-memory (e.g., in volatile memory) where it can be served from faster memory devices (e.g., SRAM, DRAM, or SDRAM) of the source caching server 13 as opposed to being served from the slower on-disk memory devices (e.g., non-volatile memory devices) of the backing data store server 16.

In some embodiments of the present invention, source caching server 13 is based on a general-purpose distributed in-memory caching system such as, for example, a Memcached or Redis cluster. More information on Memcached and Redis is available on the Internet at "/wiki/Memcached" and "/wiki/Redis," respectively, in the "en.wikipedia.org" domain.

In some embodiments of the present invention, migration controller 15, in conjunction with application server 12, is involved in migrating the cache (or a portion thereof) from the source caching server 13 to the target caching server 14. This migration may be performed for a variety of reasons including, but not limited to, to rebalance or reshard cache data.

Rebalancing cache data may include increasing or decreasing the number of computing nodes over which the shards (portions or partitions) of the cache data are allocated at target caching server 14 relative to the number of computing nodes of the source caching server 13.

A computing node can be a computing device, a virtual machine, or an application container, for example.

It is also possible to rebalance cache data without increasing or decreasing the number of computing nodes by allocating shards over the same number of computing nodes where the allocation of shards to computing nodes at the target caching server 14 is different from the allocation of shards to computing nodes at the source caching server 13.

Resharding cache data may include increasing or decreasing the number of shards of the caching cluster over which the cache data is allocated at target caching server 14 relative to the number of shards of the caching cluster at source caching server 13.

It is also possible to reshard cache data without increasing or decreasing the number of shards by allocating the cache data over the same number of shards where the allocation of the cache data to shards is different from the allocation of the cache data to shards at the source caching server 13. For example, the migration may change the key hashing scheme used to allocate the keyed cache data to shards from one hashing scheme used at the source caching server 13 to a different hashing scheme used at the target caching server 14.

In addition, or as an alternative, to rebalancing or resharding the cache, the cache (or a portion thereof) may be migrated to achieve a data transformation on cache data. For example, the target caching server 14 may be configured with a cryptographic encryption mechanism that cryptographically encrypts cache data written to the target caching server 14 such that the cache data is encrypted when "resting" in the cache at the target caching server 14.

The source caching server 13 may not support this encryption mechanism. As such, cache data may be migrated to secure the cache data when at rest in the cache by the encryption mechanism of the target caching cluster 14. Other reasons for migrating the cache are possible and embodiments are not limited to any particular reason or reasons for migrating the cache.

The cache (the portion thereof) at source caching server 13 that is migrated to target caching server 14 may generally be structured as a distributed in-memory key-value store. The keys are distributed over a number of shards of the cache. The shards of the cache are distributed over a cluster of computing nodes. A node can be a virtual machine, an application container (e.g., a Docker container), or a bare metal machine (e.g., computer system 900 of FIG. 9 described below), for example.

The assignment of shards to computing nodes can be one-to-one or many-to-one.

In some embodiments of the present invention, the source caching server 13 and/or the target caching server 14 contain primary shards and secondary shards thereof. The secondary shards mirror (via a replication mechanism) the primary shards during ordinary operation of the caching server, for example, for the purpose of increasing data availability and greater resiliency to failure of a primary shard (or failure of a node at which a primary shard is stored).

In some embodiments, the hashing scheme used to assign keys to shards is changed from the existing hashing scheme used at the source caching server 13 to a different hashing scheme used by the target caching server 14 where the different hashing scheme balances the number of keys mapped to each shard of the target caching server 14 and also minimizes the number of reassignments of keys to different shards when migrating the cache (or a portion thereof).

One example of a suitable hash function for accomplishing this is the "jump consistent hash function," which accepts as input a key and the total number of shards over which the key could possibly be assigned (e.g., the number of shards of the target caching server 14). The function returns an integer value identifying the shard to which the input key is assigned. The jump consistent hash function or other similar consistent hash function is especially useful in the cache migration context where the shards of the target caching server 14 can be uniquely identified within the system by sequential numbering, as opposed to arbitrary shard names or identifiers. More information on the jump consistent hash function is available on the Internet at /ftp/arxiv/papers/1406/1406.2294.pdf in the arxiv.org domain.

Like source caching server 13, target caching server 14 may store cache data in-memory (e.g., in volatile memory) where it can be served from faster memory devices (e.g., SRAM, DRAM, or SDRAM) of the target caching server 14 as opposed to being served from the slower on-disk memory devices (e.g., non-volatile memory devices) of the backing data store server 16.

In some embodiments of the present invention, target caching server 14 is based on a general-purpose distributed in-memory caching system such as, for example, a Memcached or Redis cluster indicated above.

In some embodiments of the present invention, the source caching server 13 and the target caching server 14 are based on different general-purpose distributed in-memory caching systems or different versions of the same caching systems. For example, the source caching server 13 might be based on a Memcached cluster while the target caching server 14 may be based on a Redis cluster, or vice-versa. It is also possible that the source caching cluster 13 is an old version of a caching system (e.g., with a recently identified security vulnerability) and the target caching cluster 14 is a newer version of that caching system (e.g., with a software patch applied to the vulnerability).

In some embodiments of the present invention, a purpose of the cache migration is to upgrade the caching system to a newer version or switch caching system vendors or types (e.g., from Memcached to Redis or vice-versa).

While each of the servers 12, 13, 14, and 16 and migration controller 15 depicted in FIG. 1 can be implemented on a single computing device including all on the same computing device, any of those servers may, in practice, may be composed of multiple computing nodes (e.g., virtual machines, application containers, or bare metal machines) that are arranged in a distributed computing configuration.

Further, the node or nodes of which a server 12, 13, 14, or 16 or migration controller 15 is composed may be shared with some or all of the node or nodes of which one or more others of the servers 12, 13, 14, or 16 or migration controller 15 are composed.

It is also possible for a server 12, 13, 14, or 16 or migration controller 15 to not share any of its nodes with another server 12, 13, 14, or 16 or migration controller 15.

Like application server 12, migration controller 15 may be external to source caching server 13 and target caching server 14. By "external," it is meant that both the application server 12 and the migration controller 15 can accomplish their respective cache migration tasks as an ordinary caching client of the source caching server 13 and the target caching server 14. Significantly, a special or dedicated application programming interface (API) of the source caching server 13 or the target caching server 14 is not needed to accomplish cache migration tasks. Instead, the usual API that an ordinary caching client would use to accomplish reading, writing, and deleting cache data may be used for the cache migration tasks performed by the application server 12 and the migration controller 15.

For example, the APIs offered by the source caching server 13 and the target caching server 14 to ordinary caching clients and which may be used for cache migration by the migration controller 15 and the application server 12 may include the following primitive key-value operations (which may go by different names for different APIs):

TABLE 1

Example Caching Server Primitives

| | |
|---|---|
| Write(k, v) | Writes a key. In particular, sets the value of key k to the value v in the cache. |
| Read(k) | Reads a key. In particular, reads the current value of key k from the cache. |

TABLE 1-continued

Example Caching Server Primitives

| | |
|---|---|
| Delete(k) | Deletes a key. In particular, removes key k and its associated current value from the cache. |
| SetAdd(k, m) | The value of key k in the cache is structured as a set. This operation adds value m as a unique member of the set. |
| SetRemove(k, m) | The value of key k in the cache is structured as a set. This operation removes value m from the set. |
| SetMembers(k) | The value of key k in the cache is structured as a set. This operations returns the value of key k in the cache which is the set of members. |
| Scan(cursor, count) | For incrementally iterating over all of the keys in the cache. This operation returns a list of keys at the given cursor up to count number of keys and a new cursor that can be used in the next call to Scan if there are more keys available. |

In some embodiments of the present invention, one or more above-primitives may be used by the migration controller 15 and the application server 12 to migrate the cache (or a portion thereof) from the source caching server 13 to the target caching server 14.

In some embodiments, each of the key-value primitive operations (e.g., Write, Read, and Delete in Table 1 above) of source caching server 13 and target caching server 14 that may be invoked by the migration controller 15 and the application server 12 to accomplish cache migration are assumed by the migration controller 15 and the application server 12 to be linearizable with respect to the cache data to which the primitive operations are applied by the source caching server 13 or the target caching server 14. However, by using techniques of the present invention described herein, the migration controller 15 and the application server 12 are not required to acquire locks or use other concurrency synchronization primitives with respect to cache data when invoking a key-value primitive operation of the source caching server 13 or the target caching server 14 that operates on that cache data. The concept of linearizability was defined by Maurice Peter Herlihy and Jeannette Marie Wing in their 1987 paper "Linearizability: A Correctness Condition for Concurrent Objects."

Cache Migration States

Figure 2:
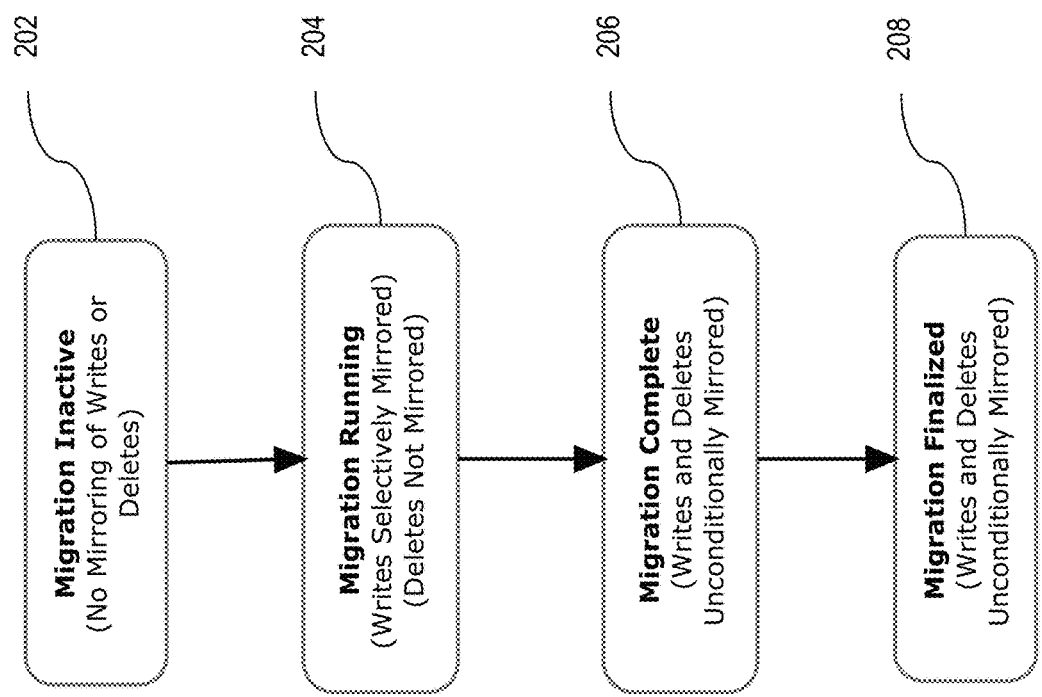
FIG. 2 is a state diagram of the online cache migration.

FIG. 2 is a state diagram of an online cache migration according to some embodiments of the present invention. At state 202, the cache migration is inactive and the application server 12 does not mirror writes or deletes to the source caching server 13 in the target caching server 14. At state 204, the cache migration is running and the application server 12 selectively mirrors writes to the source caching server 13 in the target caching server 14 but does not mirror deletes to the source caching server 13 in the target caching server 14. At state 206, the cache migration is completed and the application server 12 unconditionally mirrors both writes and deletes to the source caching server 13 in the target caching server 14. At state 208, the cache migration is finalized and the application server 12 continues to unconditionally mirror writes and deletes.

In some embodiments of the present invention, when the cache migration is inactive 202, the migration controller 15 does not copy values of keys from the source caching server 13 to the target caching server 14 and the application server 12 reads, writes, and deletes keys in the source caching server 13 as part of the application server 12 using the source caching server 13 as its primary caching server for reads, writes, and deletes. When the cache migration is inactive 202, the application server 12 need not interact with the target caching server 14.

The migration controller 15 may transition the cache migration from inactive 202 to running 204. In some embodiments, the migration controller 15 causes this transition by changing the value of a particular "cache migration status" key in source caching server 13 from "INACTIVE," or the like, to "RUNNING," or the like. The cache migration status key may be identified by a predefined key name such as, for example, "cache_migration_status," or the like. The application server 12 can read the value of the cache migration status key from the source caching server 13 to determine if the cache migration is running 204. The inactive state 202 can also be represented by the absence of the cache migration status key in the source caching server 13. In this case, the migration controller 15 can cause the transition from the inactive state 202 to the running state 204 by creating the cache migration status key in the source caching server 13 with a value or "RUNNING" or the like.

It should be noted that cache migration may be accomplished based on the source caching server 13. That is, the cache migration status key for tracking the cache migration status is stored in the source caching server 13, as opposed to the target caching server 14. By doing so, the application server 12 can determine whether a cache migration is running without having to read from the target caching server 14.

In some embodiments of the present invention, the cache migration is performed on a per-shard basis and the cache migration status key for tracking the caching migration status of a shard is stored on a per-shard basis (e.g., in that shard). This allows cache migration of some but not all of the shards of the source caching server 13 (partial cache migration). This also allows shards of the source caching server 13 to be migrated separately and independently (e.g., at different times) of other shards of the source caching server 13.

Description of some embodiments herein assume there is a single cache migration status key stored at the source caching server 13. However, as mentioned above, the cache migration status key and the cache migration can be applied on a per-shard basis. Therefore, one skilled in the art will recognize that these embodiments can be applied on a per-shard basis including storing and managing cache migration status keys on a per-shard basis.

In the running state 204, the migration controller 15 copies the values of keys from the source caching server 13 to the target caching server 14. The application server 12 may continue to read, write, and delete keys in the source caching server 13 while the caching migration is running 216. The application server 12 also selectively mirrors writes of keys to the source caching server 13 in the target caching server 14. However, the application server 12 does not mirror deletes to the source caching server 13 in the target caching server 14 while the online cache migration is running 204. Instead, as explained in greater below, the deletes in the source caching server 13 performed by the application server 12 while the cache migration is running 204 are reconciled by the migration controller 15 with the target caching server 14 after the migration controller 15 has finished copying keys from the source caching server 13 to the target caching server 14 but before the cache migration status is transitioned from running 204 to complete 206. As explained below, this deferred reconciliation of deletes avoids inconsistency of the cache data between the source caching server 13 and the target caching server 14.

After the migration controller 15 has finished copying values of keys from the source caching server 13 to the target caching server 14 and after the migration controller 15 has finished reconciling deletes, the migration controller 15 may change the value of the cache migration status key in source caching server 13 to indicate that the cache migration is now in the complete state 206. While in the complete state 206, the application server 12 can continue to read, write, and delete keys in the source caching server 13. In addition, the application server 12 now unconditionally mirrors writes to the source caching server 13 in the target caching server 14 and unconditionally mirrors deletes of keys to the source caching server 13 in the target caching server 14 to keep the respective caches eventually consistent while the cache migration is in the complete state 206.

When the target caching server 14 is ready to be used by the application server 12 as its primary caching server for reads, writes, and deletes, then the online cache migration may be transitioned from the complete state 206 to the finalized state 208. In the finalized state 208, the application server 12 now uses the target caching server 14 as its primary caching server for reads, writes, and deletes and no longer uses the source caching server 13 as its primary caching server for reads, writes, and deletes. Also, the application server 12 unconditionally mirrors writes and deletes to the target caching server 14 in the source caching server 13. By doing so, the application server 12 can revert to using the source caching server 13 as its primary caching server without loss of cache data should a problem or issue be detected after the application server 12 has begun using the target caching server 14 as its primary caching server for reads, writes, and deletes.

Once it is certain that the application server 12 will not need to revert to using the source caching server 13, then the application server 12 may be configured to use the target caching server 14 as its primary caching server for reads, writes, and deletes without unconditionally mirroring writes or deletes to the target caching server 14 in the source caching server 13. This configuration is equivalent to the inactive state 202 above where the target caching server 14 has become a new "source" caching server for the next online cache migration that may occur.

Possible Race Conditions

The possible race conditions that could occur while the cache migration is running 204 will now be described.

Since the migration controller 15 is reading from the source caching server 13 and writing to the target caching server 14 at the same time the application server 12 is permitted to write to both the source caching server 13 and the target caching server 14 and because neither the migration controller 15 nor the application server 12 obtains locks (or acquires another concurrency synchronization primitive) on the cache data when doing so, it is possible for the migration controller 15 and the application server 12 to "race" with respect to the same key.

First Possible Race Condition

Figure 3A:
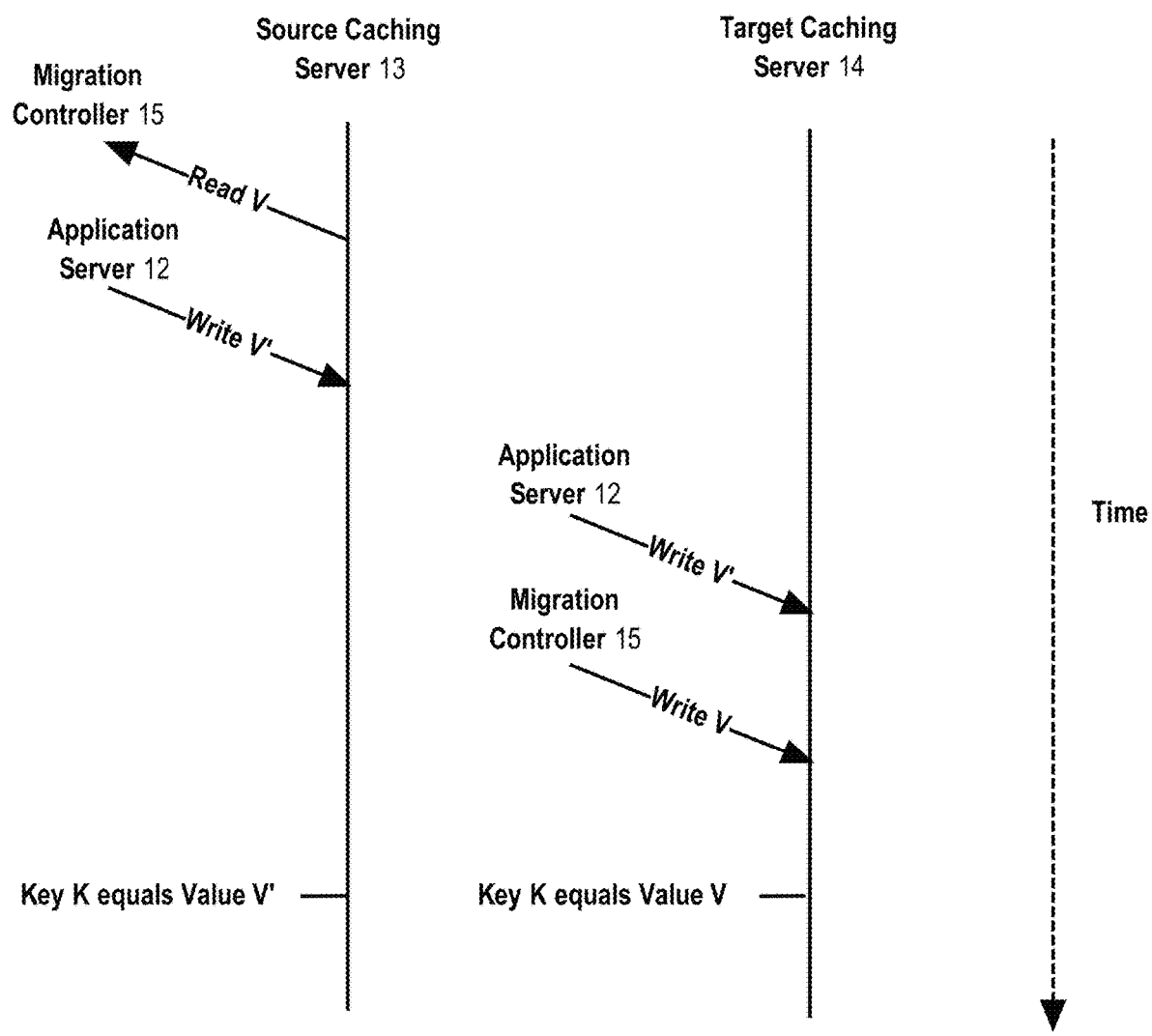
FIG. 3A is an interaction diagram that depicts an example undesired result of a first possible race condition that could occur while the online cache migration is running.

FIG. 3A is an interaction diagram that depicts a first possible race condition that could occur between the migration controller 15 and the application server 12 while the caching migration is running 204. The first possible race condition leaves the source caching server 13 and the target caching server 14 in an inconsistent state.

As a result of the first possible race condition, the migration controller 15 writes a stale (old) value for the key written by the application server 12 to the target caching server 14 when mirroring writes, thereby leaving the source caching server 13 and the target caching server 14 in inconsistent states. This undesired result is depicted in the interaction diagram FIG. 3A.

At a first time, the migration controller 15 reads value V for key K from the source caching server 13.

At a second time after the first time, the application server 12 writes a different value V' for the same key K to the source caching server 13.

At a third time after the second time, the application server 12 "wins" the race with the migration controller 15 and writes the different value V' for the key K to the target caching server 14.

At a fourth time that is after the third time, the migration controller 15 then writes the now stale (old) value V for the key K to the target caching server 14. As a result, the target caching server 14 and the source caching server 13 are inconsistent (do not agree) with respect to the value of the key K.

As discussed above, to avoid the first possible race condition, the application server 12 does not mirror the write of value V' for key K in the source caching server 13 in the target caching server 14 unless a current value for key K already exists in the target caching server 14. If a current value for key K already exists in the target caching server 14, then it is because the migration controller 15 has already completed copying of the key K from the source caching server 13 to the target caching server 14.

In some embodiments of the present invention, during the running state 204, the application server 12 selectively mirrors writes to the source caching server 13 in the target caching server 14. More specifically, before the application server 12 mirrors a write of a key to the source caching server 13 in the target caching server 14, the application server 12 first checks if the key exists in the target caching server 14 by attempting to read any existing current value for the key from the target caching server 14. If an existing current value for the key is successfully read from the target caching server 14, then the application server 12 mirrors the write of the key to the source caching server 13 in the target caching server 14. If the read does not return an existing current value for the key in the target caching server 14, then the application server 12 does not mirror the write of the key to the source caching server 13 in the target caching server 14. By this selective mirroring operation by the application server 12, the first possible race condition is avoided.

In some embodiments of the present invention, this selective mirroring is accomplished by a performing a "write if exists" operation against the target caching server 14 where the target caching server 14 only writes the given value for a specified key to its cache data if the specified key exists in the cache data with a current value at the time the write if exists operation is performed. The write if exist operation may be use in lieu of attempting to read an existing current value for the key from the target caching server 14.

According to some embodiments of the present invention, the first possible race condition is avoided by the selective mirroring of writes performed by the application server 12 while the cache migration is running 204 as just described.

Second Possible Race Condition

Figure 3B:
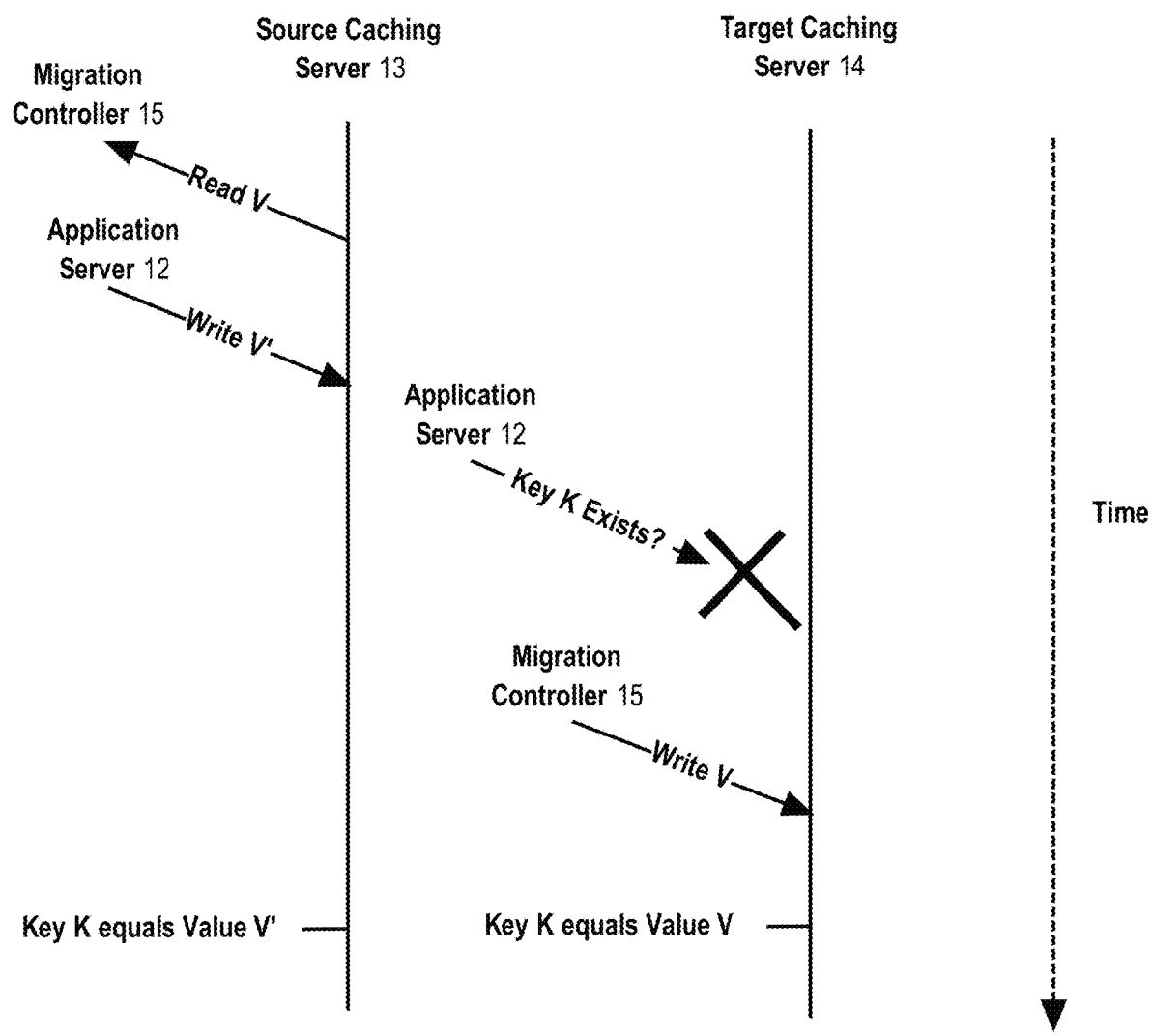
FIG. 3B is an interaction diagram that depicts an example undesired result of a second possible race condition that could occur while the online cache migration is running.

Since the application server 12 selectively mirrors writes to the source caching server 13 in the target caching server 14, a second possible race condition can occur. This is illustrated in interaction diagram of FIG. 3B. Like the first possible race condition, the second possible race condition also leaves the source caching server 13 and the target caching server 14 in an inconsistent state.

According to some embodiments of the present invention, the second possible race condition is allowed to occur. However, to ensure eventual consistency of the cache data migrated from the source caching server 13 to the target caching server 14, the migration controller 15 uses an upper bound race condition vulnerability window for each value copied from the source caching server 13. The use of this window 420 is depicted in the interaction diagram of FIG. 4 and explained below. Before that, the second possible race condition will be explained with respect to FIG. 3B.

The second possible race condition involves the application server 12 determining not to write the value V' for a key K to the target caching server 14 because the key K is does not exist in the target caching server 14 with a current value. Thereafter, the migration controller 15 writes the value V to the target caching server 14 causing the source caching server 13 and the target caching server 14 to be in inconsistent states with respect to the value of key K.

Upper Bound Race Condition Vulnerability Window

As mentioned, the migration controller 15 may use an upper bound race condition vulnerability window to ensure eventual consistency of the migrated cache data at target caching server 14 with the cache data at the source caching server 13 in the event the second possible race condition occurs with respect to a key K.

Figure 4:
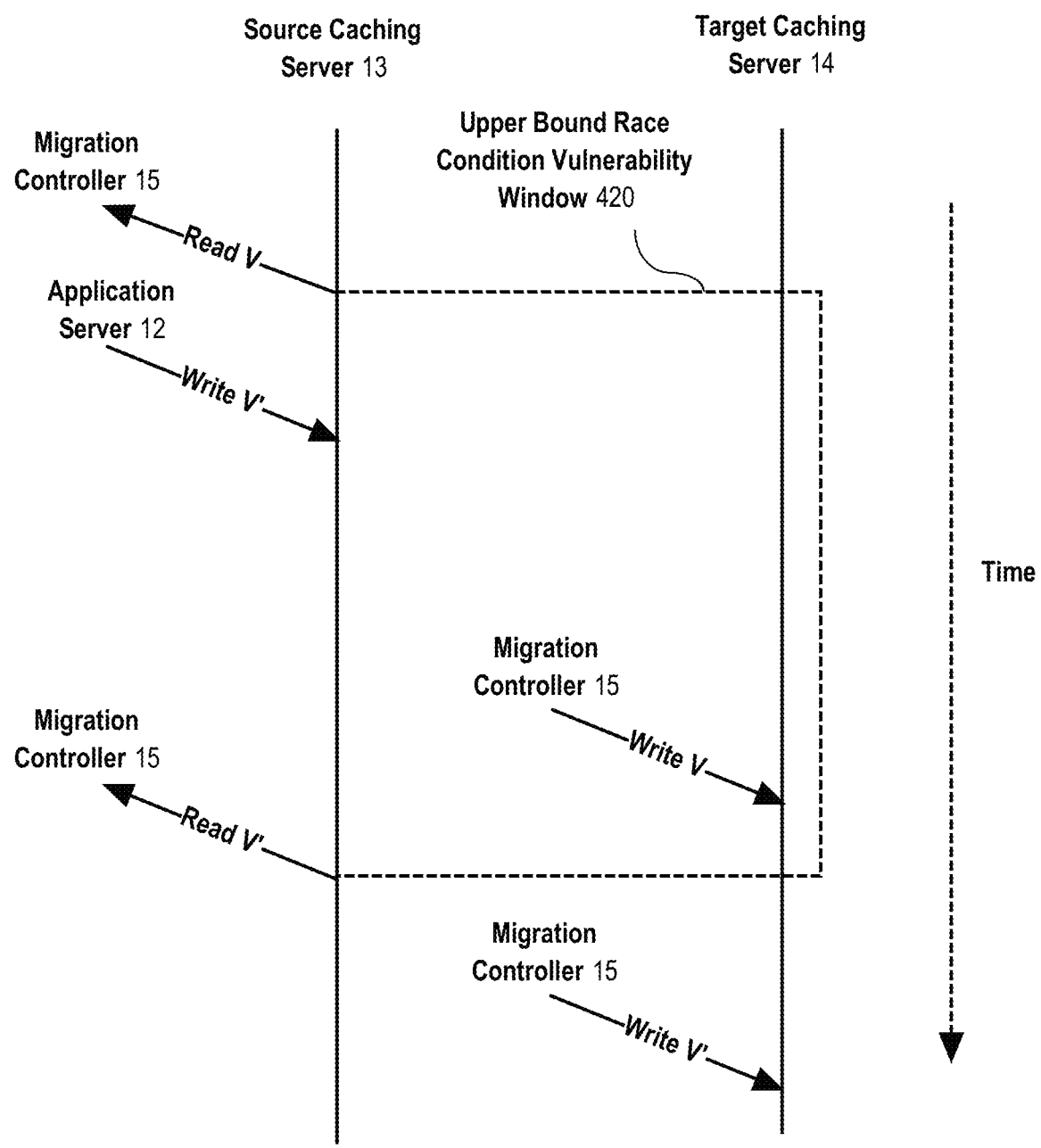
FIG. 4 is an interaction diagram that depicts the use of an example upper bound race condition vulnerability window to ensure eventual consistency of source and target caches while the online cache migration is running.

As shown in FIG. 4, the upper bound race condition vulnerability window 420 starts when the migration controller 15 reads the current value V of the key K to be copied (migrated) from the source caching server 13 to the target caching server 14. The window 420 ends thereafter when the migration controller 15 re-reads the then current value V' of the key k from the source caching server 13, which is after the migration controller 15 has written (copied) the value V of the key K read at the start of the window 420 to the target caching server 14.

The window 420 is an upper bound on the race condition vulnerability because the re-read of the key K from the source caching server 13 that marks the end of the window 420 is after the value V read at the start of the window has been successfully copied from the source caching server 13 to the target caching server 14. As such, the re-read will detect any writes to the source caching server 13 by the application server 12 to the same key K that occurred after the start of the window 420. If the migration controller 15 detects that the value of the key K changed in the source caching server 13 during the window 420, then the migration controller 15 repeats the copy operation with the now different value V'. This starts a new upper bound race condition vulnerability window for the new value V'. This is repeated as often as necessary until the last copied value for the key K does not change in the source caching server 13 during the vulnerability window for that value. By doing this, eventual consistency is ensured even though the second possible race condition depicted in FIG. 3B can still occur.

In some embodiments of the present invention, as a practical matter, use of the upper bound race condition vulnerability window by the migration controller 15 may rely on the application server 12 not continually changing the value of a key at a rate that is greater than the rate at which the migration controller 15 repeatedly copies values of that key. In some embodiments of the present invention, the migration controller 15 may stop the cache migration with an error if more than a threshold number (e.g., 1,000) of copies for a key have been attempted and the value of the key changed in the source caching server 13 during the most recent upper bound race condition vulnerability window for the key.

Migrating (Copying) Keys

Figure 5:
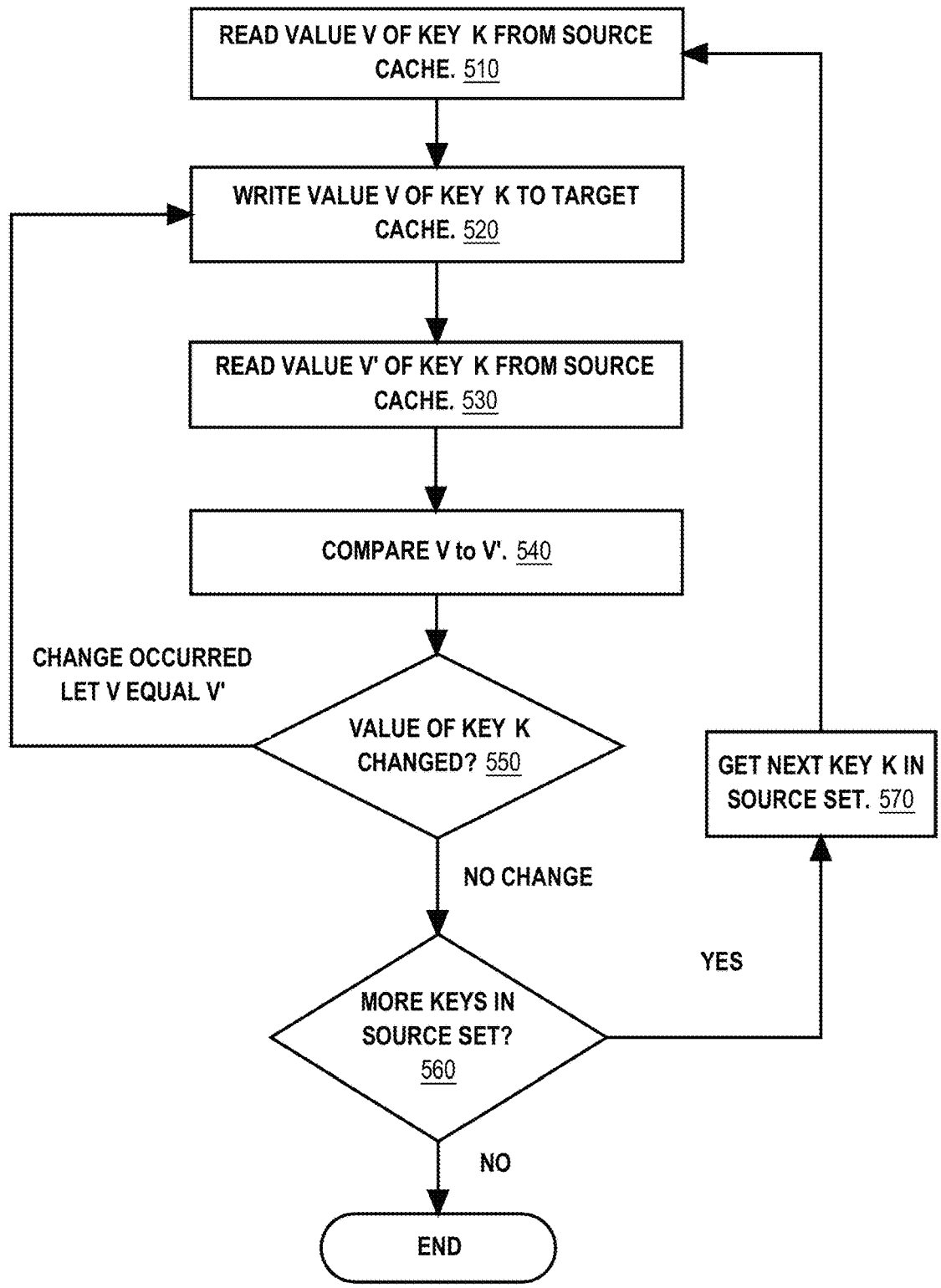
FIG. 5 is a flowchart that depicts an example process of a migration controller for migrating a set of source keys while the online cache migration is running.

FIG. 5 depicts a process 500 for online cache data migration in a distributed caching system using a hybrid migration process. The process 500 begins with a set of source keys to be migrated from the source caching server 13 to the target caching server 14. The set of source keys identified can be all keys of the source caching server 13 or a subset thereof. Operations 510-570 are performed for each key in the source set. Each of the operations 510-570 will now be described with respect to a given key K in the source set. In some embodiments, process 500 is performed by the migration controller 15 while an online cache migration is running 204.

At operation 510, the migration controller 15 reads the then current value V of key K from the source caching server 13. This starts the current upper bound race condition vulnerability window for the value V of the key K to be copied.

Next, at operation 520, the migration controller 15 writes the current value V of key K to the target caching server 14.

Next, at operation 530, the migration controller 15 re-reads the then current value V' of the key K from the source caching server 13. This ends the current upper bound race condition vulnerability window.

Next, at operation 540, the migration controller 15 compares the value V to the value V' to determine if the value of the key K changed in the source caching server 13 during the current vulnerability window. In some embodiments of the present invention, this determination is made by comparing V to V' for byte equality (i.e., contain the same bytes in the same order). In this case, if the values V and V' are byte equal, then it is determined that the value of the key K did not change in the source caching server 13 during the current vulnerability window. On the other hand, if the values V and V' are not byte equal, then it is determined that the value of the key K did change in the source caching server 13 during the current vulnerability window.

According to operation 550, if the value of the key K did change in the source caching server 13 during the current vulnerability window, then the process 500 returns to operation 520 where, for purposes of the process 500, the value V at the migration controller 15 is now the value V' at the migration controller 15 read by the migration controller 15 as a result of the prior performance of operation 530 for the key K.

On the other hand, according to operation 550, if the value did not change, then, according to operation 560, process 500 proceeds again from operation 510 for the next key 570 in the source set if there are more keys in the source set. If there are no more keys in the source set to be copied, then, according to operation 560, the process 500 ends.

Selective Write Mirroring

Figure 6:
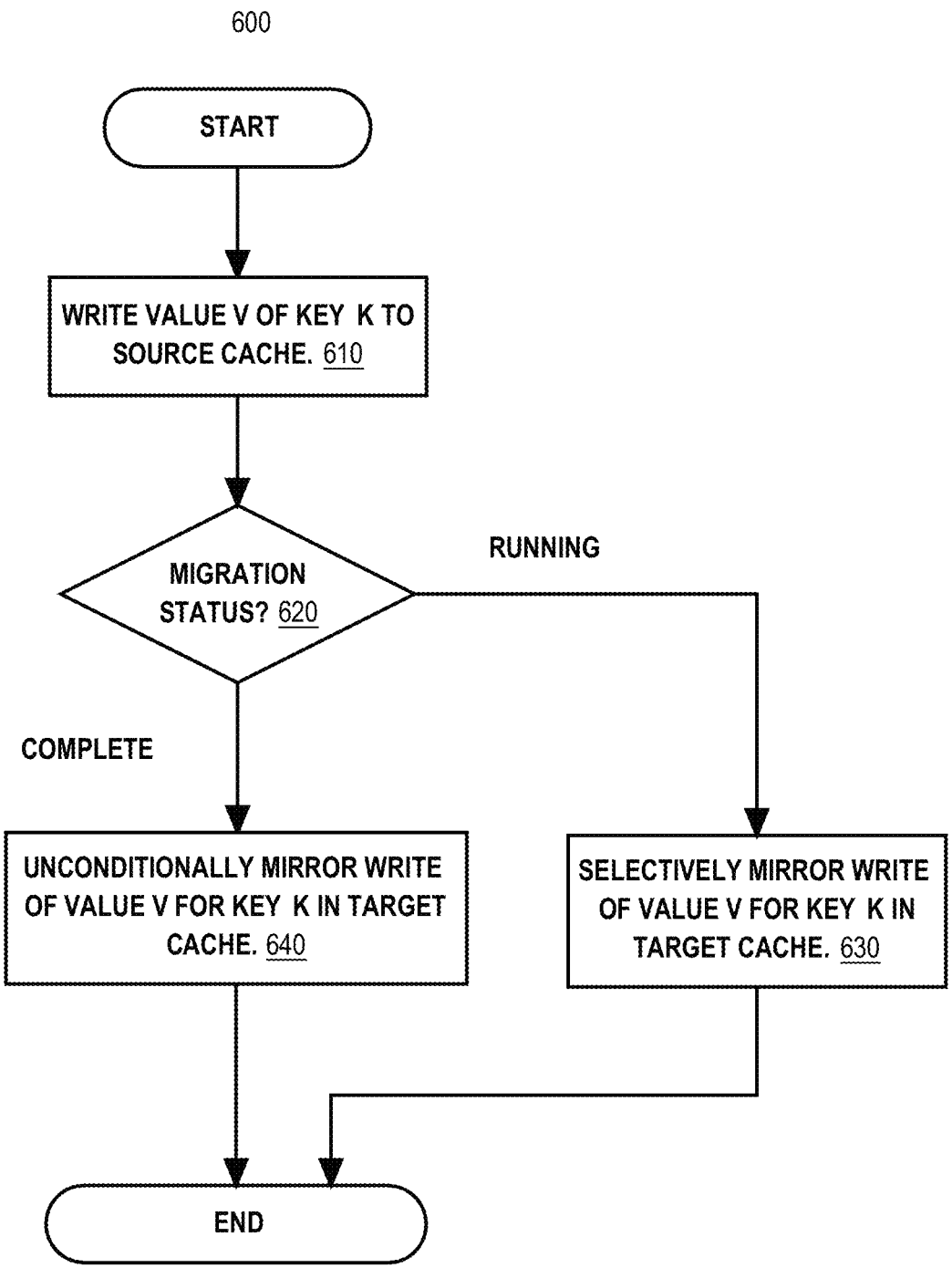
FIG. 6 is a flowchart that depicts an example process of an application server for mirroring writes.

FIG. 6 depicts a process 600 for online cache data migration in a distributed caching system using a hybrid migration process. In some embodiments, process 600 is performed by the application server 12 while an online cache migration is running 204 or completed 206.

The process 600 begins when the application server 12 writes 610 a value V of a key K to the source caching server 13.

The application server 12 determines 620 the current status of the online cache migration. This determination 620 can be made in a variety of different ways. In some embodiments of the present invention, the application server 12 reads the current value of a predefined key (e.g., the cache migration status key) in the source caching server 13 to determine whether an online cache migration is currently running 204, or complete 206. Note that the application server 12 can perform operation 620 before or after it performs operation 610.

In the case that the application server 12 determines 620 that an online cache migration is running 204, then the application server 12 selectively mirrors 630 the write at operation 610 in the target caching server 14 if and only if there is an existing current value for the key K in the target caching server 14.

On the other hand, if the application server 12 determines that an online cache migration is complete 206, then the application server 12 unconditionally mirrors 640 the write at operation 610 in the target caching server 14.

Deleting Keys During Cache Migration

In some embodiments of the present invention, the application server 12 can delete keys in the source caching server 13 while an online cache migration is running 204. However, to prevent the target caching server 14 from being inconsistent with the source caching server 13, the application server 12 does not mirror these deletes in the target caching server 14 while the migration is running 204. Instead, after the migration controller 15 has finished copying all of the keys in the source set from the source caching server 13 to the target caching server 14, the migration controller 15 deletes the keys in the source set that then no longer exist in the source caching server 13 from the target caching server 14. These keys are determined by the migration controller 15 during a delete reconciliation process, described below with respect to FIG. 8. By waiting until after the keys in the source set have been copied before reconciling the deletes, undesired results of races between the migration controller 15 copying a key to the target caching server 14 and the application server 12 deleting that key in the target caching server 14 are avoided.

Figure 7:
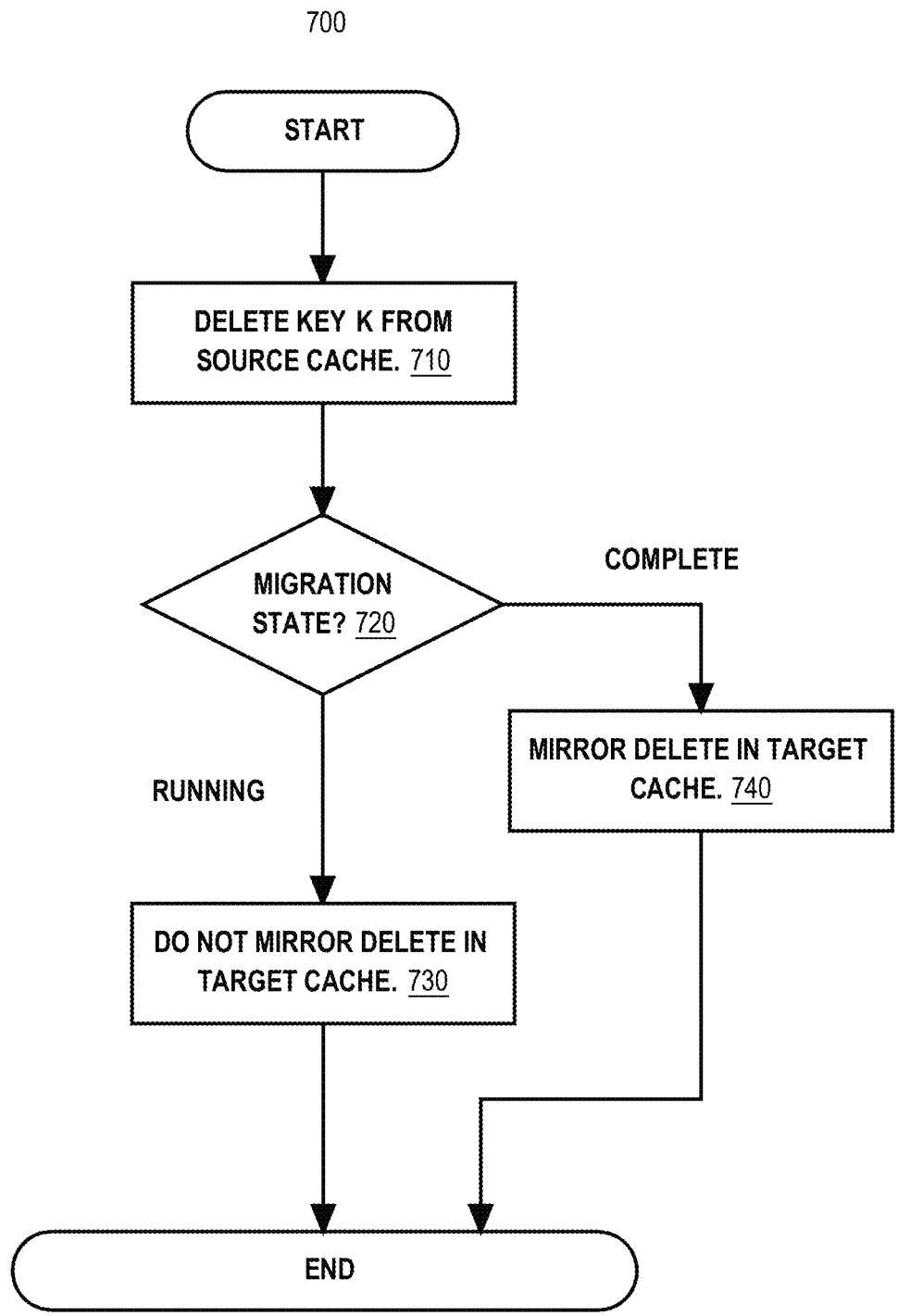
FIG. 7 is a flowchart that depicts an example process of an application server for handling deletes.

FIG. 7 depicts a process 700 for online cache data migration in a distributed caching system using a hybrid migration process. The process 700 begins when the application server 12 deletes 710 a key K from the source caching server 13 while an online cache migration is running 204 or complete 206.

At operation 720, the application server 12 determines 720 if an online cache migration is currently running (e.g., by reading the cache migration status key). Note that this operation 720 may be performed by the application server 12 before or after operation 710.

If the application server 12 determines 720 than an online cache migration is currently running 204, the application server 12 does not mirror 730 the delete operation in the target caching server 14. By doing so, a race condition is avoided that could result in the caches at the source caching server 13 and the target caching server 14 being inconsistent.

On the other hand, if the application server 12 determines 720 that an online cache migration is complete 206, then the application server 12 unconditionally mirrors 740 the delete operation in the target caching server 14. By doing so, the cache at the target caching server 14 is made eventually consistent with the cache at the source caching server 13 with respect to the delete of the key at operation 710.

To see the race condition that is avoided, consider what could happen if the application server 12 were to mirror a delete operation 710 in the target caching server 14 during the running state 204. In that case, if the application server 12 were to subsequently recreate the key K in the source caching server 13 and the migration controller 15 had already by then copied key K from the source caching server 13 to the target caching server 14, then the recreated key K would not be mirrored in the target caching server 14 because of the selectively mirroring write operation mode of the application server 12. This would leave the source caching server 13 and the target caching server 14 in an inconsistent state. This inconsistent state is avoided by not mirroring the delete as in operation 730.

Deferred Keyset and Delete Reconciliation

Figure 8:
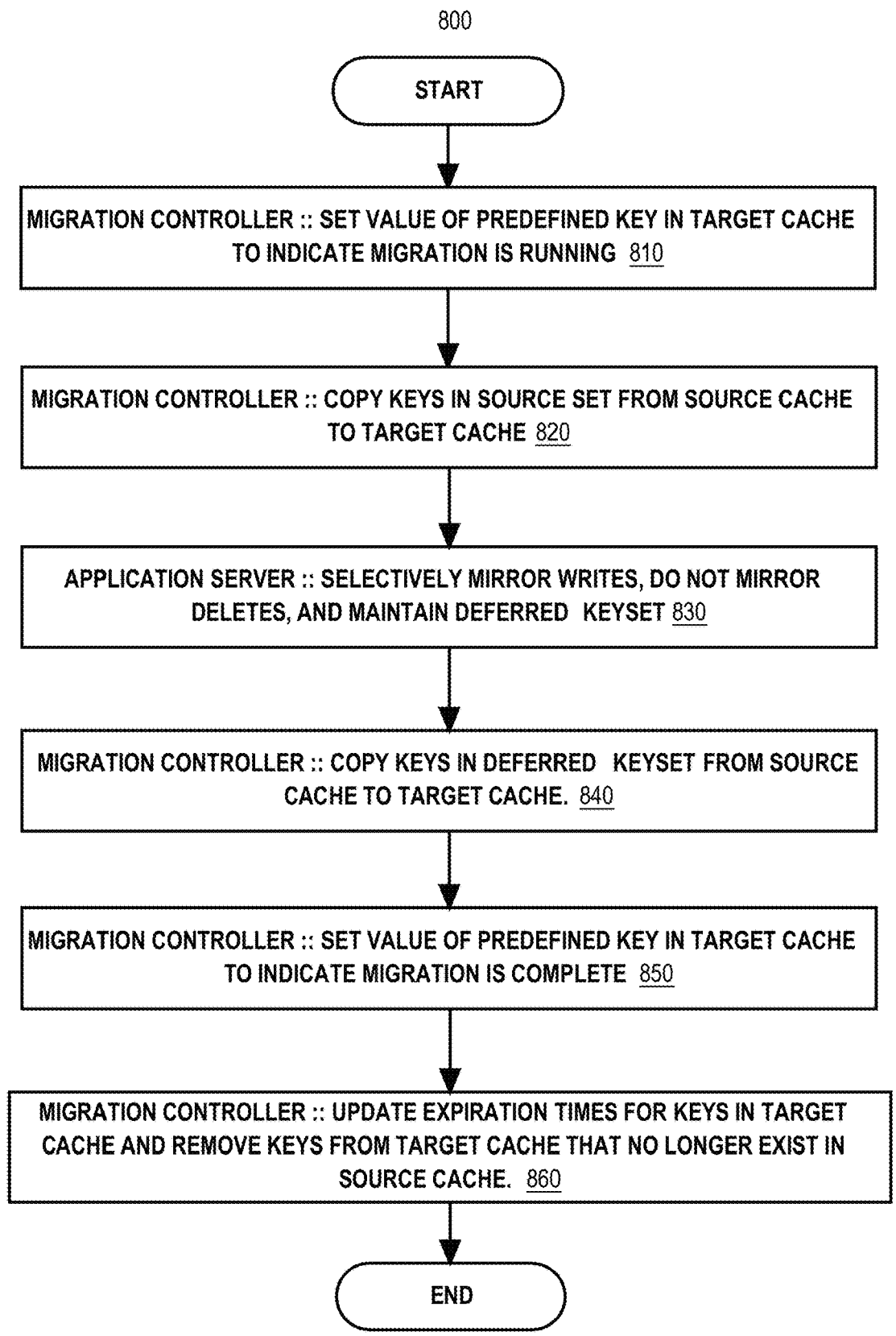
FIG. 8 depicts an example process for the online cache data migration.

FIG. 8 depicts a process 800 for online cache data migration in a distributed caching system using a hybrid migration process. The process 800 begins when the migration controller 15 sets 810 the value of cache migration status key in the source caching server 13 to indicate than an online cache migration is currently running 204.

At operation 820, while the cache migration is running 204, the migration controller 15, copies 820 the set of source keys from the source caching server 13 to the target caching server 14.

At operation 830, while the cache migration is currently running 204, the application server 12 selectively mirrors writes to the source caching server 13 in the target caching server 14. In addition, the application server 12 does not mirror deletes of keys to the source caching server 13 in the target caching server 14. Also, at operation 830, the application server 12 maintains a deferred keyset in the source caching server 13 that contains the set of keys that the application server 12 wrote to the source caching server 13 while the migration is running 204 but that, because of the selective mirroring operation of the application server 12, the application server 12 did not mirror in the target caching server 14 because the key did not then exist in the target caching server 14 with a current value. The application server 12 may add all such detected keys to the deferred keyset in the source caching server 13. The deferred keyset may be stored in as a value of a predefined key in the source caching server 13.

Performance of operation 820 by migration controller 15 and performance of operation 830 by application server 12 may overlap in time (i.e., can be concurrent).

The migration controller 15 may not copy a key in the deferred keyset at operation 820 if the key is not included in the source key set. A key in the deferred keyset may not be included in the source keyset because it may have been added to the source caching server 13 after the migration controller 15 had by then already scanned past where the key would be in the scan order when scanning the source caching server 13 for the source key set (e.g., using the SCAN operation above). As such, to ensure that deferred keys are migrated, the migration controller 15 may copy them at operation 840 from the source caching server 13 to the target caching server 14 after the migration controller 15 has finished copying (operation 820) keys in the source set.

At operation 850, after the migration controller 15 has completed copying the set of source keys (operation 820) and after the migration controller 15 has processed the deferred keyset (operation 840), the migration controller 15 sets the value of the cache migration status key in the target caching server 14 from running 204 to complete 206. Note that it is possible for the application server 12 to race with the migration controller 15 with respect to the application server 12 adding a key to the deferred keyset in operation 830 and the migration controller 15 processing the deferred keyset at operation 840. The result of this race can be that the deferred keyset has one or more keys that are not processed by the migration controller 15 at operation 840. Because these keys are not processed by the migration controller 15 at operation 840, they are not migrated to the target caching server 14. However, the target caching server 14 can fetch these keys from the backing data store server 16 as part of regular cache miss operation. Since the time between (a) when the migration controller 15 finishes processing the deferred keyset at operation 840 and (b) when the application server begins unconditionally mirroring writes should be relatively short (e.g., a few seconds or less), the number of unprocessed keys in the deferred keyset should be relatively few. Thus, the load on the backing data store server 16 resulting from unprocessed keys in the deferred keyset should not be significant.

At operation 860, the migration controller 15 performs delete reconciliation. In the particular, the migration controller 15 updates cache data expiration times for copied cache data in the target caching server 14 and also removes keys from the target caching server 14 that no longer exist in the source caching server 13. By doing so, the cache at the target caching server 14 is made eventually consistent with the cache at the source caching server 13 with respect to deletes to the source caching server 13 submitted by the application server 12 while the cache migration was running 204. For this, the migration controller 15 may scan the list of source keys copied at operation 820, and for each such key, read the expiration time for the key from the source caching server 13.

The expiration time for a key may be a timeout value or a time to live value that specifies how long an unmodified value for the key is stored in the cache before it is automatically deleted by the caching server. If the value for the key is modified in the cache before the expiration of the timeout or time to live period, then the timeout or time to live period is restarted for the new value.

If a key copied at operation 820 no longer exists in the cache at the source caching server 13 at operation 860, then the key is deleted from the target caching server 14 at operation 860. Otherwise, the expiration time for the key read from the source caching server 13 is set on the key in the target caching server 14. By doing so, the cache at the target caching server 14 is made eventually consistent with the cache at the source caching server 13 with respect to deletes to the source caching server 13 submitted by the application server 12 while the cache migration was running 204.

Sometime after operation 860 is complete, the value of the cache migration status in the source caching server 14 may be changed (either automatically or manually) from complete 206 to finalized 208. This signals the application server 12 that it may begin using the target caching server 14 as its primary caching server for cache reads, writes, and deletes.

Note that it is possible for the migration controller 15 at operation 860 to delete a key from the target caching server 14 that was deleted from the source caching server 13 after the key was copied at operation 820 but was added back to the source caching server 13 by the application server 12 after the migration controller 15 unsuccessfully attempted at operation 860 to read the expiration time for the key from the source caching server 13. The attempt may be unsuccessful because the key did not then exist in the source caching server 13 having been previously deleted. For example, consider the following sequence:

(1) the migration controller 15 copies a key from the source caching server 13 to the target caching server 14.

(2) the application server 12 deletes the key from the source caching server 13.

(3) the migration controller 15 reads the expiration time from the source caching server 13 and does not find the key present in the source caching server 13.

(4) the application server 12 writes a new instance of the key to the source caching server 13 and unconditionally mirrors the new instance in the target caching server 14.

(5) the migration controller 15 deletes the key from the target caching server 14 based on the now stale information obtained a step (3) above.

In this scenario, the key may be restored to the cache at the target caching server 14 from the backing data store server 16 when the key is used for read. Since this race condition between the application server 13 and the migration controller 15 should ordinarily be a relatively rare occurrence, such cache misses would not be expected to create significant computing resource demand on the backing data store server 16.

Basic Computing System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
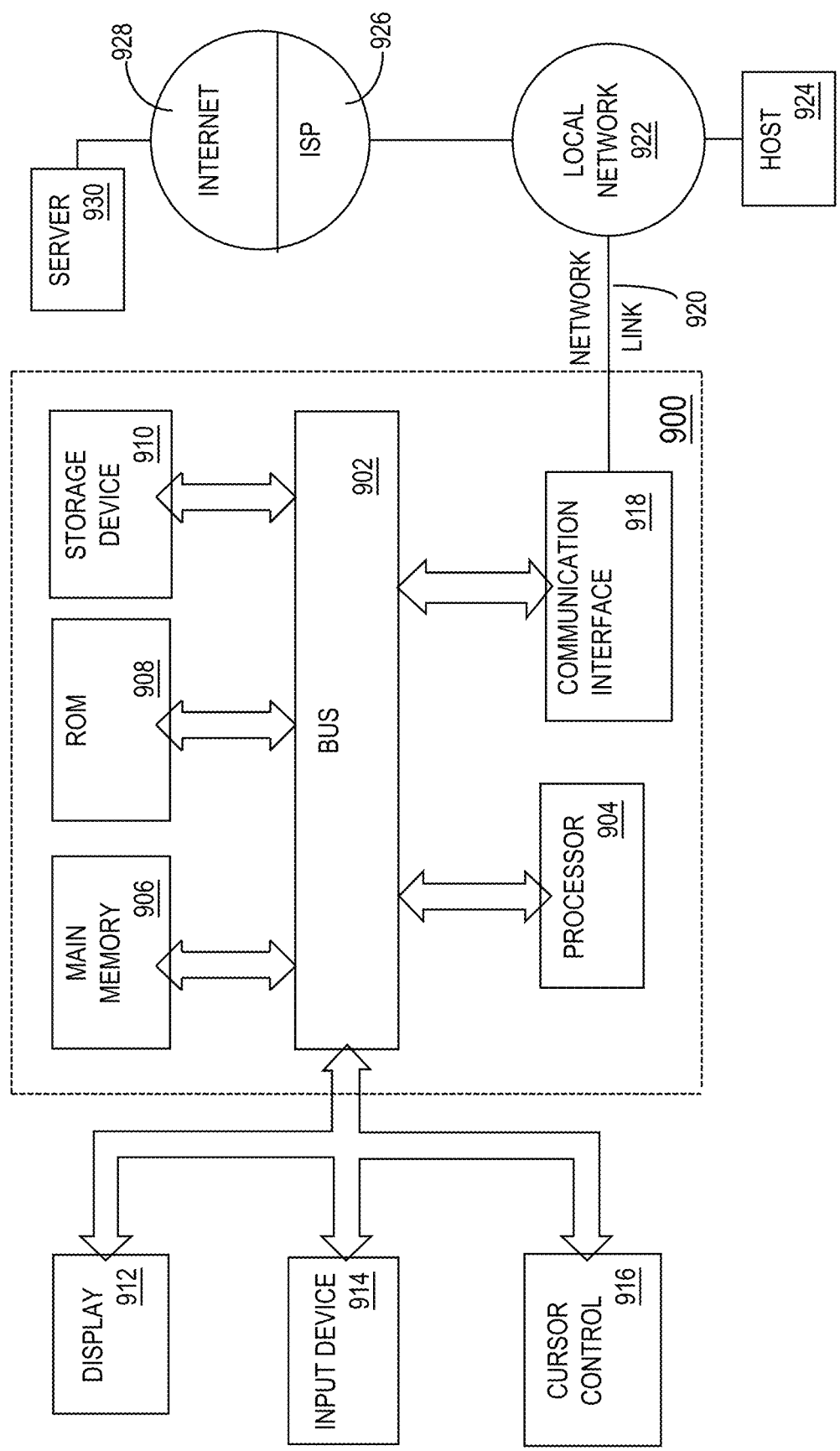
FIG. 9 depicts example hardware for online cache migration in a distributed caching system using a hybrid migration process.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as an OLED, LED or cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. The input device 914 may also have multiple input modalities, such as multiple 2-axes controllers, and/or input buttons or keyboard. This allows a user to input along more than two dimensions simultaneously and/or control the input of more than one type of action.

Computer system 900 may implement the techniques described herein using customized hard-wired logic, one or more ASICs or FPGAs, firmware and/or program logic which in combination with the computer system causes or programs computer system 900 to be a special-purpose machine. According to some embodiments, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a hard disk, solid-state drive, magnetic tape, or any other magnetic data storage medium, a CD-ROM, any other optical data storage medium, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be a modem to provide a data communication connection to a corresponding type of telephone or coaxial line. As another example, communication interface 918 may be a network card (e.g., an Ethernet card) to provide a data communication connection to a compatible Local Area Network (LAN). Wireless links may also be implemented. In any such implementation, communication interface 918 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method, comprising:
   determining, at an application server in a network environment, that an online cache data migration is running;
   based on the application server determining that the online cache data migration is running, selectively mirroring, at the application server, writes to a source caching server in a target caching server; and
   migrating, at an external migration controller in the network environment, values associated with a set of source keys from the source caching server to the target caching server including for at least one particular key of the set of source keys:
      copying a first value of the particular key from the source caching server to the target caching server,
      determining whether the first value of the particular key changed to a second value at the source caching server, and
      copying the second value from the source caching server to the target caching server based on determining that the first value of the particular key changed to the second value at the source caching server.

2. The computer-implemented method of claim 1, wherein the selectively mirroring, at the application server, writes to the source caching server in the target caching server includes:
   after writing a particular value of a particular key to the source caching server, writing the particular value for the particular key to the target caching server only if the particular key has an existing current value at the target caching server.

3. The computer-implemented method of claim 2, further comprising:
   determining whether the particular key has an existing current value at the target caching server by attempting to read a current value for the particular key from the target caching server.

4. The computer-implemented method of claim 2, further comprising:
   after the writing the particular value of the particular key to the source caching server, successfully reading an existing current value of the particular key from the target caching server; and
   writing the particular value of the particular key to the target caching server based on the successfully reading the existing current value of the particular key from the target caching server.

5. The computer-implemented method of claim 2, further comprising:
   after the writing the particular value of the particular key to the source caching server, determining that the particular key does not have an existing current value at the target caching server; and
   not writing the particular value of the particular key to the target caching server based on the determining that the particular key does not have an existing current value at the target caching server.

6. The computer-implemented method of claim 1, wherein the source caching server and the target caching server are each a distributed caching system composed of a plurality of computing nodes.

7. The computer-implemented method of claim 1, wherein:
   determining whether the first value of the particular key changed to the second value at the source caching server is based determining whether the first value of the particular key changed to the second value at the source caching server during an upper-bound race condition vulnerability window for the first value and the particular key; and
   copying the second value from the source caching server to the target caching server is based on determining that the first value of the particular kiey changed to the second value at the source cahcing server during the upper-bound race condition vulnerability window for the first value and particular key.

8. One or more non-transitory storage media storing instructions which, when executed by one or more computing devices, cause performance of:
   determining, at an application server in a network environment, that an online cache data migration is running;
   based on the application server determining that the online cache data migration is running, selectively mirroring, at the application server, writes to a source caching server in a target caching server; and
   migrating, at an external migration controller in the network environment, values associated with a set of source keys from the source caching server to the target caching server; and
   wherein the migrating the values associated with the set of source keys from the source caching server to the target caching server includes for at least one particular key of the set of source keys:
      copying a first value of the particular key from the source caching server to the target caching server,
      determining whether the first value of the particular key changed to a second value at the source caching server, and
      copying the second value from the source caching server to the target caching server based on determining that the first value of the particular key changed to the second value at the source caching server.

9. The one or more non-transitory storage media of claim 8, wherein the instructions, when executed by one or more computing devices, further cause performance of:
   after copying the first value associated with the particular key from the source caching server to the target caching server, reading an expiration time associated with the particular key from the source caching server, and associating the expiration time with the particular key in the target caching server based on the reading the expiration time associated with the particular key from the source caching server.

10. The one or more non-transitory storage media of claim 8, wherein the instructions, when executed by one or more computing devices, further cause performance of:
    after copying the first value and the second value associated with the particular key from the source caching server to the target caching server, unsuccessfully attempting to read an expiration time associated with the particular key from the source caching server, and deleting the particular key from the target caching server based on the unsuccessfully attempting to read an expiration time associated with the particular key from the source caching server.

11. The one or more non-transitory storage media of claim 8, wherein the instructions, when executed by one or more computing devices, further cause performance of:
    determining, at the application server, that the online cache data migration is complete; and based on the application server determining that the online cache data migration is complete, unconditionally mirroring, at the application server, writes to the source caching server in the target caching server.

12. The one or more non-transitory storage media of claim 8, wherein the instructions, when executed by one or more computing devices, further cause performance of:
based on the application server determining that the online cache data migration is running, not mirroring, at the application server, deletes to the source caching server in the target caching server.

13. The one or more non-transitory storage media of claim 8, wherein the instructions, when executed by one or more computing devices, further cause performance of:
determining, at the application server, that the online cache data migration is complete; and
based on the application server determining that the online cache data migration is complete, unconditionally mirroring, at the application server, deletes to the source caching server in the target caching server.

14. One or more non-transitory storage media of claim 8, wherein the instructions, when executed by one or more computing devices, further cause performance of:
determining, at the application server, that an online cache data migration is running based on reading, at the application server, a value of a predefined key from the source caching server.

15. One or more non-transitory storage media of claim 8, wherein the source caching server and the target caching server are each a distributed caching system composed of a plurality of computing nodes.

16. One or more non-transitory storage media of claim 8, wherein the selectively mirroring, at the application server, writes to the source caching server in the target caching server includes:
after writing a particular value of a particular key to the source caching server, writing the particular value for the particular key to the target caching server only if the particular key has an existing current value at the target caching server.

17. One or more non-transitory storage media of claim 8, wherein the source caching server uses a different key hashing algorithm for mapping keys to shards than the target caching server.

18. One or more non-transitory storage media of claim 8, wherein the instructions, when executed by one or more computing devices, further cause performance of:
while the online cache data migration is running, reading, at the application server, values of keys, of the set of source keys, from the source caching server.

19. A computing system comprising:
one or more processors;
storage media;
one or more programs stored in the storage media and configured for execution by the one or more processors, the one or more programs comprising instructions configured for determining, at an application server in a network environment, that an online cache data migration is running;
means of an external migration controller for migrating values associated with a set of source keys from a source caching server to a target caching server while the online cache data migration is running; and
means of the application server for selectively mirroring writes to the source caching server in the target caching server while the online cache data migration is running.

20. One or more non-transitory storage media of claim 8, wherein:
determining whether the first value of the particular key changed to the second value at the source caching server is based determining whether the first value of the particular key changed to the second value at the source caching server during an upper-bound race condition vulnerability window for the first value and the particular key; and
copying the second value from the source caching server to the target caching server is based on determining that the first value of the particular key changed to the second value at the source caching server during the upper-bound race condition vulnerability window for the first value and particular key.

* * * * *